3,323,497
GEAR TRANSMISSION CONSTRUCTION FOR ROTARY MECHANISMS

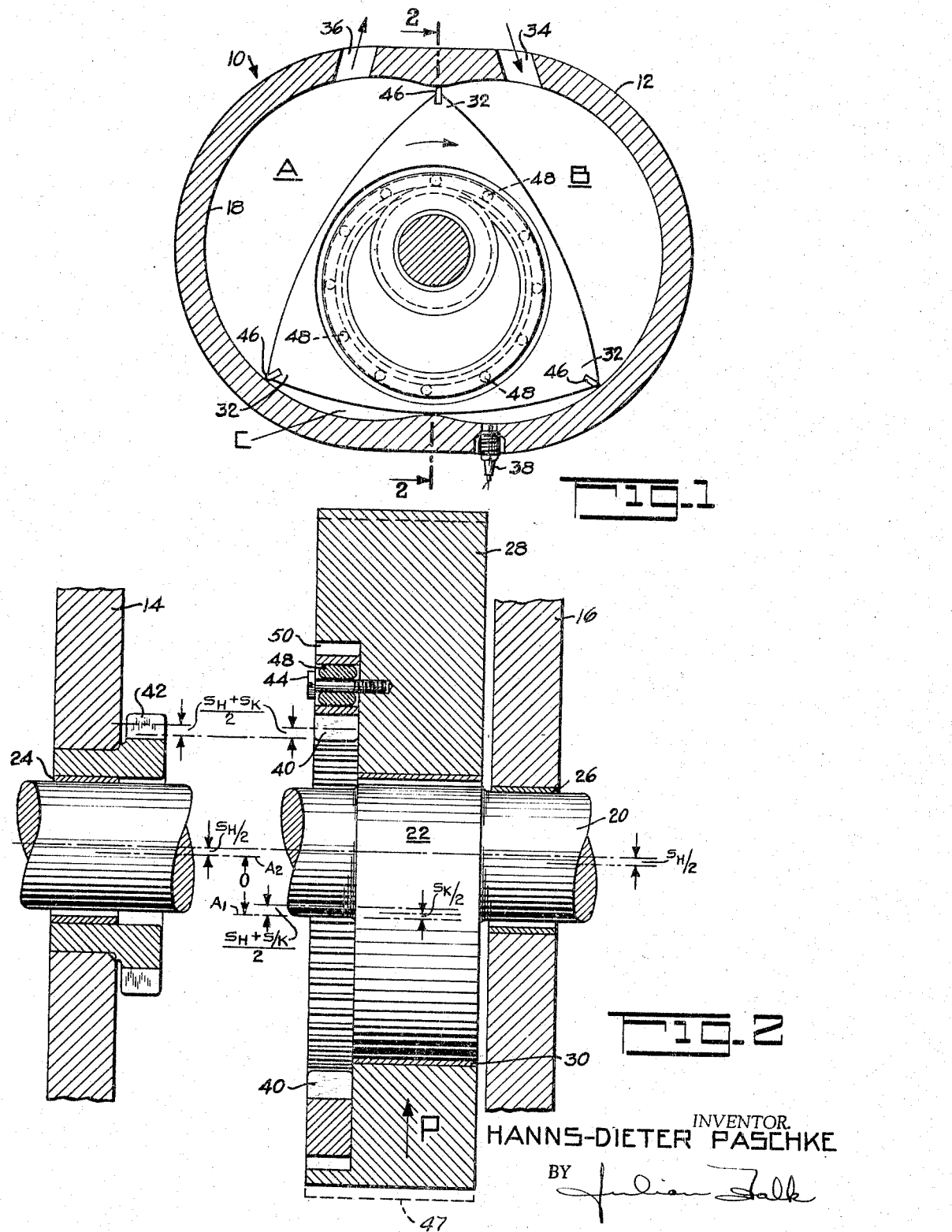

Hanns-Dieter Paschke, Neckarsulm, Wurttemberg, Germany, assignor to NSU Motorenwerke Aktiengesellschaft, Neckarsulm, Germany, and Wankel G.m.b.H., Lindau (Bodensee), Germany
Filed Jan. 13, 1965, Ser. No. 425,233
Claims priority, application Germany, Jan. 22, 1964, N 24,339
4 Claims. (Cl. 123—8)

This invention relates to rotary combustion engines and is particularly directed to a novel gear transmission construction for eliminating excessive clearance between the meshing teeth of the gears in said gear transmission mechanism.

The invention disclosed herein will be described in relation to a rotary internal combustion engine including an outer body having an inner profile which is preferably basically a two-lobed epitrochoid and an inner body or rotor which has three lobes, said inner body or rotor having a profile corresponding approximately to the inner envelope of the epitrochoid. It should be understood, however, that the invention may be embodied in other forms of rotary mechanisms such as, for example, an outer body having three lobes with an inner body having four lobes.

In general, the outer body of the rotary combustion engine is stationary with the rotor being relatively rotatable with respect to said outer body. In order to maintain a fixed ratio of rotation between the rotor or inner body and the eccentric shaft upon which the rotor is mounted, a hollow gear is fixed to the rotor and a pinion gear is fixed to the outer body with the ratio of the gears preferably being 3:2. The rotor is preferably supported for rotation on the eccentric shaft by a plane sleeve-type bearing and the eccentric shaft is supported for rotation in the outer body end walls also by plane sleeve-type bearings. The tooth clearance between the meshing rotor gear and the fixed gear is determined by the total play between the bearings supporting the rotor on the shaft eccentric and the bearings supporting the shaft in the outer body end walls with said tooth clearance being equal to or greater than the total bearing play.

Because of the bearing play and the tooth clearance must normally be relatively large which results in slight oscillations or back and forth motion of the rotor. As a result of the oscillations of the rotor the forces acting on the seal strips carried by said rotor are increased which may lead to chattering of the seals relative to their sealing surfaces and may even lead to breakage of the seal strips.

The excessive tooth clearance is removed, in accordance with the invention, by taking up the bearing play displacement. In an engine construction not employing the invention the rotor gear is coaxial with the eccentric portion. The outer body gear is coaxial with the shaft. In accordance with the invention, at least one of these gears is displaced in a radial direction with respect to the axis coaxial with its axis. In addition, means including a resilient means having a spring travel at least equal to half the total bearing play displacement, for supporting at least one of the gears, is so provided as to secure the close meshing engagement of the gears and thereby reduce the undesired oscillations.

In the embodiment of the rotary comubstion engine having a hollow gear wheel fastened to the rotor and a fixed pinion gear fastened to the outer body, a zero tooth clearance engagement between said gear members is obtained by a positive shift or radial outward offset of the profile of the pinion gear or a negative shift or radially inward offset of the profile of the hollow rotor gear by an amount equal to half of the total bearing play or by a corresponding shift of the profile of both the pinion and the hollow gear. In the preferred embodiment described below, the elastic supporting means is provided between the rotor and the hollow gear member although it will be obvious that other arrangements are possible. Through the arrangement of the present invention continuous engagement between the meshing teeth of the gear members is obtained and uniform and exact positioning of the rotor is maintained during operation. It will be further seen moreover, that the load-carrying capacity of the gear arrangement is improved because the meshing teeth of the gears are always in perfect engagement irrespective of the bearing play.

Accordingly, it is one object of the invention to provide a novel and improved gear support structure for a rotary mechanism.

It is another object of the invention to provide a novel and improved means for maintaining the positioning of the rotor during relative rotation of said rotor with the outer body.

It is an additional object of the invention to provide a novel and improved gear support construction comprising an elastic means which has a spring travel which is equal to or greater than the total bearing play between the outer body and the eccentric shaft, and the rotor and the eccentric shaft.

It is still a further object of the invention to provide a gear transmission mechanism between the rotor and the outer body in a rotary combustion engine wherein the tooth clearance between the meshing teeth of the gears respectively carried by the rotor and the outer body is zero.

Other objects and advantages of the invention will be best understood from the following detailed description with the accompanying drawings wherein:

FIG. 1 is a sectional view of a rotary combustion engine embodying the invention; and FIG. 2 is an enlarged axial exploded sectional view taken along line 2—2 of FIG. 1.

Referring to the drawing, there is shown therein a rotary piston engine composed of an outer body 10 which includes a peripheral wall 12 and a pair of end walls 14 and 16 interconnected with said perihperal wall 12 to form a cavity. As seen in FIG. 1, the profile of the inner surface 18 of the peripheral wall 12 is preferably basically a two-lobed epitrochoid. A shaft 20 is supported for rotation in the outer body 10 with a plane sleeve-type bearings 24 and 26 surrounding the shaft 20 at each end wall 14 and 16, respectively. The shaft 20 has an eccentric portion 22 formed thereon upon which is supported a rotor 28 for relative rotation with respect to said eccentric portion 22, said rotor 28 being supported on said eccentric portion 22 by a plane sleeve-type bearing 30. As viewed in FIG. 1, it can be seen that the rotor 28 is provided with three apex portions 32 which are disposed in sealing engagement with the inner surface 18 of the peripheral wall 12 so that during relative rotation between the rotor 28 and the outer body 10 a plurality of working chambers A, B, and C are formed which vary in volume. An intake port 34 is provided for admitting air and/or a fuel-air mixture, an exhaust port 36 is provided for expelling the burnt gases from the engine and an ignition means, which may comprise a spark plug 38, is provided for igniting the fuel-air mixture so that the stages of intake, compression, expansion and exhaust may be carried out. For a more detailed description of the operation of this type of engine, reference may be made to U.S. Patent No. 2,988,065 issued on June 13, 1961, to Felix Wankel et al.

In the embodiment illustrated having a two-lobed outer body and a three-lobed rotor, the shaft 20 will rotate three times for each complete revolution of the rotor. In order to maintain a fixed ratio of rotation between the rotor and the eccentric shaft, a gear transmission is provided which comprises a hollow or ring gear member 40 attached to the rotor 28 which meshes with a pinion gear 42 suitably fixed to an outer body end wall 14. The rotor gear or hollow gear 40 is suitably connected to the rotor 28 as by screws 44 or the like. Because of the bearing play between the bearings 24, 26 and the shaft 20 and the bearing play between the bearing 30 supporting the rotor 28 on the eccentric portion 22, a substantial tooth clearance is required between the gears 40 and 42. The bearing play of the bearings 24 and 26 is designated herein as $S_H$ and the bearing play between the bearing 30 and the eccentric portion 22 is designated as $S_K$. It has been found that the rotor 28 can deviate from its normal rotative position as much as half the total bearing play or $0.5\ (S_H+S_K)$. This displacement of the rotor axis $A_1$ from its normal position, and thus also being a displacement relative to the normal position of the axis $A_2$ of the gear 42, must be taken into account by a corresponding tolerance of the pitch circles between the gears 40 and 42. The tooth clearance produced by this tolerance permits a to and fro oscillation of the rotor within the limits of the tooth clearance which thus may lead to increased forces acting on the apex portions of the rotor which normally carry radially movable seal strips 46 and thus may cause the seals to chatter within their grooves or even lead to breakage of the seal strips.

In accordance with the present invention, means are provided for eliminating excessive tooth clearance between the meshing teeth of the gears which causes the oscillations of the rotor. Referring to FIG. 2 the normal position of the rotor relative to the eccentric shaft 20 as designated by the positions of their respective axes $A_1$ and $A_2$ is designated by the arrow O. It will be seen that the rotor axis coincides with the axis of the eccentric portion and the shaft axis coincides with the axis of the outer body 10. The normal position of the rotor 28 is further designated by the dotted line outline 47 of the rotor in FIG. 2. When the rotor 28 is loaded in the direction of the arrow P, which approximately corresponds to the loading of the rotor during ignition in a working chamber C. Lacking the presence of the invention disclosed herein, the rotor will become displaced by half the total bearing play, $0.5\ (S_H+S_K)$, from its normal position into the position shown by the solid line outline of the rotor 28 so that the rotor axis $A_1$ will be displaced in a direction toward the gear axis $A_2$. When the rotor is in this position or in a position where the rotor axis and the housing or gear axis come closest together, the tooth clearance between the teeth of the gear 40 and the gear 42 will be at a maximum which will amount to half the total bearing play.

In order to eliminate excessive clearance between the meshing teeth of the gears 40 and 42 during loading of the rotor and loading of the bearings, the profile of the pinion gear 42 is positively offset radially or displaced by an amount equal to half of the total bearing play, $0.5\ (S_H+S_K)$ in the direction of displacement of the rotor relative to the outer body. At the same time, the hollow gear 40 attached to the rotor 28, is provided with a plurality of elastic means 48 which may comprise a plurality of elastic ring members surrounding the fastening means or screws 44, as can be seen in FIG. 2. Since the elastic means surround the screws 44, which are fixed to the rotor 28, the hollow rotor gear 40 may move radially relative to the screws 44 and the rotor 28 in the cutout portion 50 provided for the gear 42. It will be apparent that since the rotor gear 40 may move radially the cutout 50 must be given an oversized dimension to permit relative movement with respect to the rotor 28. As shown in FIG. 2, the elastic means 48 is relaxed when the rotor 28 is loaded. When the rotor 28 is unloaded the elastic means 48 is compressed urging the radially offset pinion gear 42 into meshing engagement with the hollow gear 40.

The elastic means or elastic ring members 48 are chosen so that they have an elastic or spring travel which is at least equal to half the total bearing play. Thus, when the rotor 28 is displaced from its normal position the elastic ring members 48 will permit movement of the rotor relative to the gear 42, which elastic means will cause the gear, as the rotor becomes unloaded, to spring back toward a normal position with respect to the rotor as the rotor rotates relative to the outer body. With the arrangement of the offset pinion gear 42 and the flexible support mechanism of the gear 40, the rotor 28 may shift positions during rotation without loss of engagement between the gears 40 and 42 because the hollow gear 40 will always be held in its initial position by the pinion gear 42. This relative shifting ability of the rotor 28 with respect to the hollow gear 40 is necessary in accordance with the non-clearance meshing arrangement of the gears 40 and 42 in the present invention, for any position the rotor can assume within the limits of the bearing play, to obtain proper support for the rotor on the eccentric portion 22. Because the gear 40 is always held in its initial position by the pinion 42, it will be apparent that, if the connection of the gear 40 to the rotor 28 were rigid, the rotor would be supported by the pinion 42 instead of being supported by the eccentric portion 22. In the present invention, the elastic fastening means 48, when the rotor 28 is loaded in the direction of arrow P or in the other words when the rotor and outer body axes are spaced closest together, will be in an unloaded or stretched state and will spring elastically out of this position with the corresponding shift of the rotor 28. As the rotor 28 rotates to a position wherein the rotor is no longer loaded the elastic means 48 will return the gear to its normal position relative to the rotor 28. Since the meshing arangements of the gears have a zero clearance there is always a positive connection between the gears 40 and 42 for any loading of the rotor such as, for example, loading due to combustion in working chamber C.

While the invention has been set forth in detail in its preferred embodiment in the above description, it should be understood that the invention is not to be limited to the specific detail set forth therein and that various changes and modifications may be made by those skilled in the art without departing from the spirit and scope of the invention as defined in the following claims. For example, it is within the scope of the invention to provide elastic support means for both gear members 40 and 42 or for the pinion gear 42 by itself. It is also possible to provide an offset for the profile of the hollow rotor gear member 40 which would be equivalent to the positive displacement or offset of the gear 42 or alternatively to give a displacement or offset to the profile of both gear members 40 and 42.

I claim:

1. In a rotary combustion engine having an outer body including a peripheral wall interconnected with a pair of end walls to form a cavity, a shaft extending coaxially through said outer body and being supported for rotation relative to said outer body, said shaft having an eccentric portion thereon disposed in said cavity, a rotor supported coaxially on said eccentric portion for rotation relative to said eccentric portion and said outer body, bearing means including a bearing supporting said shaft in each of said outer body end walls and a bearing supporting said rotor on said eccentric portion with the play in said bearing means causing relative radial movement of said rotor and said shaft such that during relative rotation of said rotor and said shaft spacing between the axes of said rotor and said shaft varies, and a gear transmission mechanism for maintaining a fixed ratio of rotation between said rotor and said shaft, said gear transmission mechanism comprising: a gear member fixed to said rotor for rotation therewith, said rotor gear being approximately coaxial with said eccentric portion, and a gear member fixed to an outer body end wall, said outer body gear being approximately coaxial with said shaft, with said gear members being disposed in meshing relationship, support means for at least one of said gear members including elastic means, said elastic means having a spring travel at least equal to half the total bearing play of said bearing means for permitting relative radial movement between said gear member, said rotor and said outer body, at least one of said gears being radially displaced from its approximately coaxial axis such that said elastic means is effective to maintain the tooth clearance between meshing teeth of said gear members at a minimum when the high pressure combustion gas loading forces on said rotor causes said rotor to shift radially as permitted by its said bearing play.

2. In a rotary combustion engine as recited in claim 1 wherein said gear member fixed to said rotor comprises a hollow internally-toothed gear and said gear member fixed to said outer body end wall comprises a pinion gear, and said pinion gear having an offset profile relative to its coaxial axis with said offset profile being equal to one half of the total bearing play of said bearing means.

3. In a rotary mechanism as recited in claim 1 wherein said gear member fixed to said rotor comprises a hollow internally-toothed gear and said gear member fixed to said outer body end wall comprises a pinion gear, and said hollow gear having an offset profile relative to its coaxial axis with said offset profile being equal to one half of the total bearing play of said bearing means.

4. In a rotary mechanism as recited in claim 1 wherein said gear member fixed to said rotor comprises a hollow internally-toothed gear and said gear member fixed to said outer body end wall comprises a pinion gear and each of said gear members having an offset profile relative to its respective coaxial axis.

References Cited
UNITED STATES PATENTS

| | | | |
|---|---|---|---|
| 2,293,407 | 8/1942 | Schirrmeister | 74—804 |
| 2,988,065 | 6/1961 | Wankel et al. | 74—805 X |
| 3,043,164 | 7/1962 | Sundt | 74—805 X |
| 3,192,799 | 7/1965 | Pamplin | 74—805 |
| 3,295,754 | 1/1967 | Abermeth et al. | 230—145 |

DONLEY J. STOCKING, *Primary Examiner.*

THOMAS C. PERRY, *Examiner.*